(12) United States Patent
Levesque (10) Patent No.: US 12,078,575 B2
(45) Date of Patent: Sep. 3, 2024

(54) METHODS AND APPARATUS TO PERFORM LOAD MEASUREMENTS ON MULTI-HINGED DEVICES

(71) Applicant: Illinois Tool Works Inc., Glenview, IL (US)

(72) Inventor: Philippe Levesque, Levis (CA)

(73) Assignee: Illinois Tool Works Inc., Glenview, IL (US)

( * ) Notice: Subject to any disclaimer, the term of this patent is extended or adjusted under 35 U.S.C. 154(b) by 2 days.

(21) Appl. No.: 17/737,386

(22) Filed: May 5, 2022

(65) Prior Publication Data

US 2022/0357255 A1    Nov. 10, 2022

Related U.S. Application Data

(60) Provisional application No. 63/185,165, filed on May 6, 2021.

(51) Int. Cl.
*G01M 99/00* (2011.01)
*G01N 3/34* (2006.01)

(52) U.S. Cl.
CPC .......... *G01M 99/007* (2013.01); *G01N 3/34* (2013.01)

(58) Field of Classification Search
CPC ......... G01N 3/32; G01N 3/34; G01M 99/005; G01M 99/007
See application file for complete search history.

(56) References Cited

U.S. PATENT DOCUMENTS 5,574,227 A    11/1996  Allan
8,544,340 B1   10/2013  Ardelean
(Continued)

FOREIGN PATENT DOCUMENTS

CN    202522405    11/2012
CN    106338389    1/2017
(Continued)

OTHER PUBLICATIONS

Int'l Search Report and Written Opinion Appln No. PCT/US2022/028025 dated Aug. 12, 2022.

*Primary Examiner* — Erika J. Villaluna
(74) *Attorney, Agent, or Firm* — McAndrews, Held & Malloy, Ltd.

(57) ABSTRACT

An example hinged device flexible substrate testing system includes: a first plate comprising a first surface configured to hold stationary a first portion of a hinged device under test; a second plate comprising a second surface configured to hold a second portion of the hinged device under test, the second portion of the hinged device coupled to the first portion via a first hinge having a first folding radius; a third plate comprising a third surface configured to hold a third portion of the hinged device under test, the third portion of the hinged device coupled to the first portion via a second hinge having a second folding radius; a first cam follower coupled to the second plate; a first drive arm configured to move the first cam follower to cause the second plate to rotate about a first hinge pivot axis of the first hinge; a first actuator configured to rotate the first drive arm; a second cam follower coupled to the third plate; a second drive arm configured to move the second cam follower to cause the third plate to rotate about a second hinge pivot axis of the second hinge; a second actuator configured to rotate the second drive arm; and a load cell configured to measure first loads on the first plate while the first actuator moves the second plate and to measure second loads on the first plate while the second actuator moves the third plate.

16 Claims, 10 Drawing Sheets

(56) References Cited

U.S. PATENT DOCUMENTS

| | | |
|---|---|---|
| 2010/0116064 A1 | 5/2010 | Wen |
| 2017/0013729 A1 | 1/2017 | Rothkopf |
| 2019/0154555 A1 | 5/2019 | Han |
| 2019/0391058 A1 | 12/2019 | Lee |
| 2019/0391358 A1 | 12/2019 | Yang |
| 2020/0400541 A1 | 12/2020 | Levesque |
| 2021/0018412 A1 | 1/2021 | Levesque |
| 2021/0341367 A1* | 11/2021 | Joyce ................. G01N 3/04 |

FOREIGN PATENT DOCUMENTS

| | | |
|---|---|---|
| JP | 2019039743 | 3/2019 |
| KR | 101489667 | 2/2015 |
| KR | 101843874 | 3/2018 |
| WO | 2020263502 | 12/2020 |
| WO | 2021221926 | 11/2021 |

* cited by examiner

METHODS AND APPARATUS TO PERFORM LOAD MEASUREMENTS ON MULTI-HINGED DEVICES

RELATED APPLICATIONS

The present application claims the benefit of U.S. Provisional Patent Application Ser. No. 63/185,165, filed May 6, 2021, entitled "METHODS AND APPARATUS TO PERFORM LOAD MEASUREMENTS ON MULTI-HINGED DEVICES." The entirety of U.S. Provisional Patent Application Ser. No. 63/185,165 is expressly incorporated herein by reference.

BACKGROUND

This disclosure relates generally to materials testing, and more particularly, to methods and apparatus to perform load measurements on multi-hinged devices.

Reliability testing for an assembly, or moving components of an assembly, may involve repetitively performing intended and/or unintended movements of the components to verify that the components and/or assembly reliably operates for a defined minimum number of cycles of the movements. For example, reliability testing of a flexible substrate may involve repeatedly flexing the substrate in one or more ways, while testing for continued operation of the device and/or monitoring various modes of failure.

SUMMARY

Methods and apparatus to perform load measurements on multi-hinged devices are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Flexible specimens often include assemblies and/or devices that have constraint mechanisms, such as simple hinges, double hinges, elliptical mechanisms, and/or other forms of constraints. Conventional measurement systems are not capable of characterizing forces associated with flexible specimens that involve such constraint mechanisms, because conventional measurement systems are not able to fold such specimens without over-constraining the specimens (resulting in damage), and/or because the reaction forces produced by the constraint mechanisms are typically many orders of magnitude greater than the reaction forces produced by the flexible material specimen.

Disclosed example hinged device testing systems provide repetitive stress testing and/or load measurement for hinged devices having multiple hinges for 3 or more sections, while reducing or minimizing additional stress induced on the hinged device by the hinged device testing system itself. For example, some disclosed hinged device testing systems allow the specimen to be folded by the system while allowing the constraint device(s) of the specimen (e.g., hinge(s)) to determine the exact folding path of the specimen, thereby testing the specimen in the same manner as in the eventual intended use of the specimen.

Some disclosed hinged device testing systems include fixturing that provides repetitive folding and unfolding of a hinged device, such as a hinged mobile electronic device (e.g., a smartphone). In some examples, the testing systems are configured such that the hinge of the hinged device controls a folding and unfolding path of a foldable substrate, while forces on the foldable substrate are measured. Disclosed examples configure the fixturing, such as guiding of the moving parts, such that the fixturing does not create additional force on the hinge(s) of the hinged device as the sides of the hinged device are folded together or unfolded.

In some examples, the hinged device testing systems include a translation linkage to limit forces on the device that are not in the direction measured using the hinged device testing system. As an example, a translation linkage may translate lateral forces on the measured side(s) of the hinged device to forces in the direction of measurement (e.g., forces normal to a face of the hinged device, forces associated with resistance of the hinge to folding, etc.).

Disclosed examples of the hinged device testing systems include multiple dynamic, or moving, portions, and a stationary, load measuring portion. Examples of the dynamic portions include a rotary shaft which articulates corresponding drive arms. The drive arms each feature a slot in which a cam follower (e.g., a bearing) is free to travel radially along the drive arm. The bearings are each secured to a shared mounting plate that moves a portion of a hinged device that is attached to the mounting plate. The stationary, load measurement portion is affixed to a same base plate as the dynamic side. The stationary side features a static stationary mounting plate to which another portion of the hinged device is attached. In some examples, the stationary mounting plate is suspended above the base plate using parallel flexures. In addition to the parallel flexures, a load cell (e.g., including corresponding adapter components) connect the stationary mounting plate to the base plate.

In some examples, the stationary side also includes rigid mounting points, which are decoupled from the load measurement path, to which portions of the hinges may be attached to reduce or eliminate the forces of the hinges. By providing rigid mounting points for the constraint mechanisms of the specimen, disclosed examples are capable of highly sensitive measurements of the folding forces of the specimen because the reaction forces associated with the constraint mechanism are isolated from the load measurement.

Disclosed example hinged device testing systems are sufficiently versatile to accommodate a variety of constraint mechanisms, including hinges, double hinges, and mechanisms not yet contrived. Disclosed examples can accommodate different specimen sizes with little or no adjustment (e.g. 2 mm bends, 3 mm bends, etc.). Disclosed examples are capable of expansion to test multiple specimens at once by connecting the specimens to the same driveshaft. Furthermore, disclosed example testing systems are inexpensive.

Some disclosed hinged device testing systems may be configured or arranged to test and/or measure hinged devices having different folding directions, including double infold (e.g., two outer sections both fold toward a same side of a center section) and inner-outer fold (e.g., two outer sections fold toward opposite sides of a center section). To accommodate the different folding shapes that may be accomplished, the fixturing, support, and/or drive components may be shaped and/or positioned to avoid mutual physical interference and provide device-guided motion. For example, in some disclosed hinged testing device systems, one or more drive arms may have centers of rotation or pivot axes that are offset from being in alignment with the slot or guide path provided by the drive arm. Additionally or alternatively, the flexures and/or load cells may be positioned so as to provide accurate measurements without interfering with the paths of motion of the device under test and/or the drive arms.

Figure 1A:
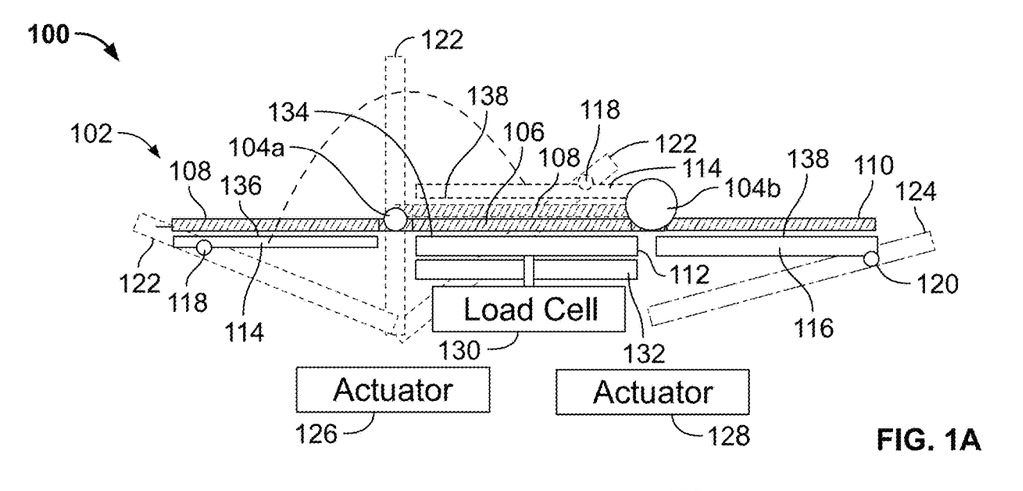
FIGS. 1A and 1B illustrate an example hinged device test system to perform mechanical property testing on a multi-hinged device in which the hinges fold toward a same side of the device, in accordance with aspects of this disclosure.
Figure 1B:
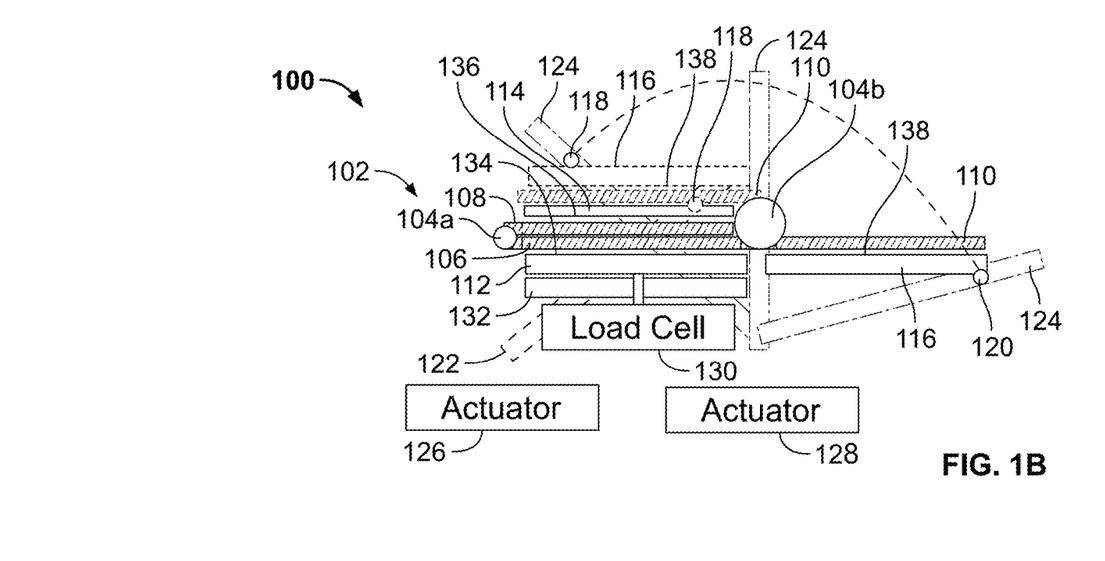

FIGS. 1A and 1B illustrate an example hinged device test system 100 to perform mechanical property testing on a multi-hinged device 102. The example multi-hinged device 102 may be an electronic or other device having two or more hinges 104a, 104b allowing at least a first portion 106, a second portion 108, and a third portion 110 of the hinged device 102 to at least partially fold. In the example of FIG. 1A, the second portion 108 and the third portion 110 of the multi-hinged device 102 are configured to fold in a double infold arrangement, in which both portions 108, 110 fold toward a same side of the center portion 106.

The system 100 of FIGS. 1A and 1B is configured to repeatedly fold and unfold the hinged device 102 to measure forces associated with the folding and unfolding (e.g., resistive forces, spring forces, etc.). To measure the folding forces of the second portion 108 and the third portion 110 separately, the example system 100 may be controlled to fold the portion 108 while measuring the forces, and subsequently measuring the portion 110 while measuring the forces. FIG. 1A illustrates the multi-hinged device 102 and the folding path of the second portion 108, and FIG. 1B illustrates the multi-hinged device 102 and the folding path of the third portion 110 while the second portion 108 is already in a folded position.

The example system 100 includes a first plate 112, a second plate 114, a third plate 116, one or more first cam followers 118 coupled to the second plate 114, one or more second cam followers 120 coupled to the third plate 116, one or more first drive arms 122, one or more second drive arms 124, a first actuator 126 configured to drive the one or more first drive arms 122, a second actuator 128 configured to drive the one or more second drive arms 124, one or more load cells 130, and a translation linkage 132. The system 100 may include additional features, such as structural support or framing, processing circuitry, communications and/or input/output (I/O) circuitry, and/or any other components.

The first plate 112 has a first surface 134 to which the first portion 106 of the hinged device 102 is attached or affixed, and held stationary with respect to the first surface 134. The second plate 114 has a second surface 136 to which the second portion 108 of the hinged device 102 is attached or affixed, and held stationary with respect to the second surface 136. The third plate 116 has a third surface 138 to which the third portion 108 of the hinged device 102 is attached or affixed, and held stationary with respect to the third surface 138. Adjacent ones of the plates 112, 114, 116 are separated by respective gaps, which are bridged by the hinges 104a, 104b.

As illustrated in FIG. 1A, the first drive arm(s) 122 moves the corresponding cam follower(s) 118 to cause the second plate 114 to rotate about a pivot axis of the hinge 104a of the hinged device 102. The actuator 126 rotates the drive arm(s) 122 to cause the second plate 114 to move the second portion 108 of the hinged device 102 from the first position (shown in solid lines) toward the first portion 106 in the folded position (shown in broken lines). The drive arm(s) 122 allow motion of the cam follower(s) 118 along slot(s) defined by the drive arm(s) 122 so that the system 100 limits or eliminates force on the first portion 106 of the hinged device 102 by the weight of the second plate 114 or the drive arm(s) 122, such that the measured force on the first portion 106 of the hinged device 102 is completely determined by the actuation of the hinge 104a.

In some examples, the actuator 126 may be a motor attached to the drive arm(s) 122 to rotate the drive arm(s) 122 about a pivot of the drive arm(s) 122. Additionally or alternatively, the drive arm(s) 122 may be actuated manually.

As illustrated in FIG. 1B, when the second portion 108 is in the folded position, the second drive arm(s) 124 move the corresponding cam follower(s) 120 to cause the third plate 116 to rotate about a pivot axis of the hinge 104b of the hinged device 102. The actuator 128 rotates the second drive arm(s) 124 to cause the third plate 116 to move the third portion 110 of the hinged device 102 from the first position (shown in solid lines) toward the first portion 106 in the folded position (shown in broken lines). The drive arm(s) 124 allow motion of the cam follower(s) 120 along slot(s) defined by the drive arm(s) 124 so that the system 100 limits or eliminates force on the first portion 106 of the hinged device 102 by the weight of the third plate 116 or the drive arm(s) 124, such that the measured force on the first portion 106 of the hinged device 102 is completely determined by the actuation of the hinge 104b.

In some examples, the actuator 128 may be a motor attached to the drive arm(s) 124 to rotate the drive arm(s) 124 about a pivot of the drive arm(s) 124.

The load cell 130 measures loads on the first plate 112 while the actuator 126 moves the second plate 114 and while the actuator 128 moves the third plate 116. In particular, the load cell 130 measures stress (e.g., folding force) on the hinged device 102 as the hinged device 102 is folded by measuring load exerted by the first portion 106 of the hinged device 102 onto the first plate 112.

The translation linkage 132 limits movement of the first plate 112 in directions other than the direction in which the load cell 130 is loaded by the first plate 112. For example, if the load cell 130 is configured to measure loads in a direction perpendicular to the plane of the first surface 134, the translation linkage 132 limits movement of the first plate 112 in directions parallel to the plane of the first surface 134 while permitting load to be transferred from the first plate 112 to the load cell 130. An example translation linkage 132 may include one or more four-bar linkages coupled to a frame that is fixed with respect to the load cell 130. In some other examples, the translation linkage 132 includes one or more flexures. In some examples, the translation linkage 132 is further limited in a direction toward the load cell 130 to prevent overloading of the load cell 130. For example, a stopping point may be attached to the frame to prevent movement of the four-bar linkage(s) and the first plate 112 toward the load cell 130 beyond the stopping point.

In operation, the example load cell 130 may be biased or offset after securing the hinged device 102 to the first plate 112, the second plate 112, and the third plate 114 to subtract a preload from the test measurements. For example, the preload on the load cell 130 may occur due to the weight of the first plate 112, the weight of translation linkage 132, and/or the weight of the first portion 106 and/or the hinges 104a, 104b of the hinged device 102 on the first plate 112. By determining the preload on the load cell 130, the load cell 130 can be calibrated or offset to measure the stress on the hinged device 102 during folding and unfolding.

Figure 2A:
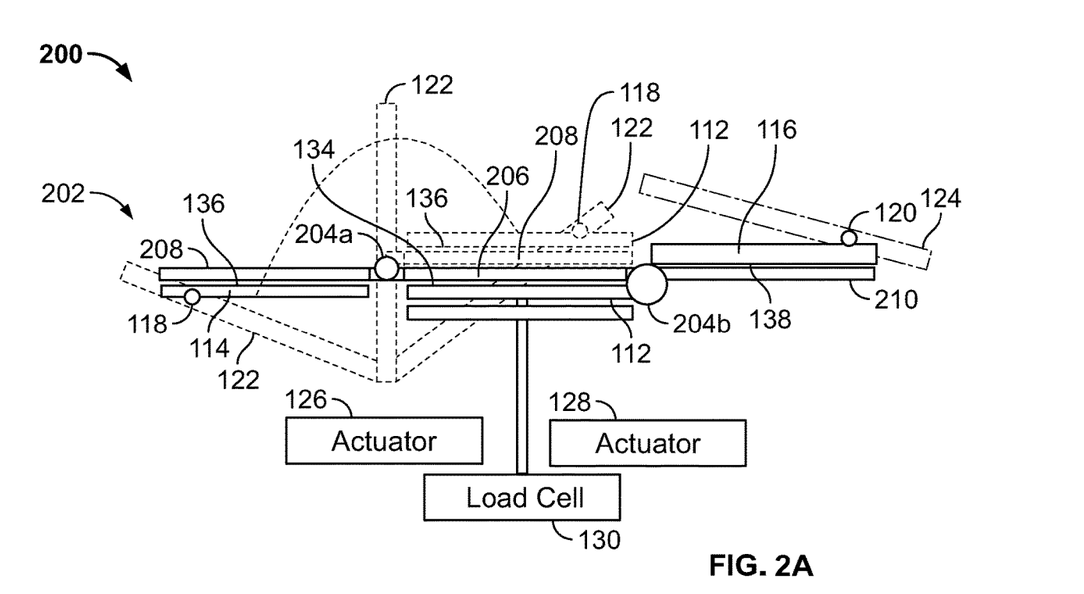
FIGS. 2A and 2B illustrate an example hinged device test system to perform mechanical property testing on a multi-hinged device in which the hinges fold toward opposite sides of the device, in accordance with aspects of this disclosure.
Figure 2B:
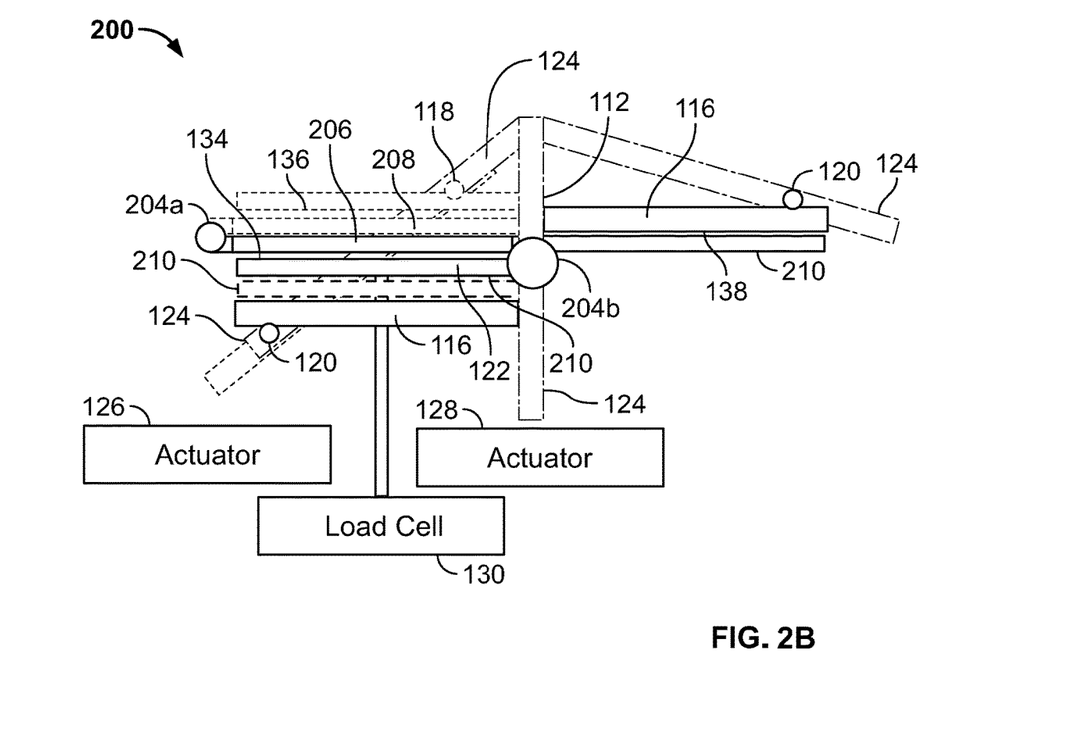

FIGS. 2A and 2B illustrate an example hinged device test system 200 to perform mechanical property testing on a multi-hinged device 202 in which the hinges 204a, 204b fold toward opposite sides of the device 202. Like the multi-hinged device 102 of FIGS. 1A and 1B, the example multi-hinged device 202 includes a first portion 206, a second portion 208 connected to the first portion 206 via a first hinge 204a, and a third portion 210 connected to the first portion via a second hinge 204b. However, the example third portion 210 is configured to fold to an opposite side of the first portion 206 than the second portion 208 (e.g., an inner-outer fold).

The example system 200 of FIGS. 2A and 2B is similar to the example system 100 of FIGS. 1A and 1B, except that the third plate 116 is configured on to connect to a different side of the third portion 210 of the device 202 to fold the third portion 210 toward an opposite side of the first portion 206 from the second portion 208.

In the example of FIGS. 2A and 2B, the load cell 130 may be configured to measure loads in a first direction when folding the second portion 208 towards the first side of the first portion 206, and measure loads in a second direction when folder the third portion 210 towards the second side of the first portion 206.

Figure 3:
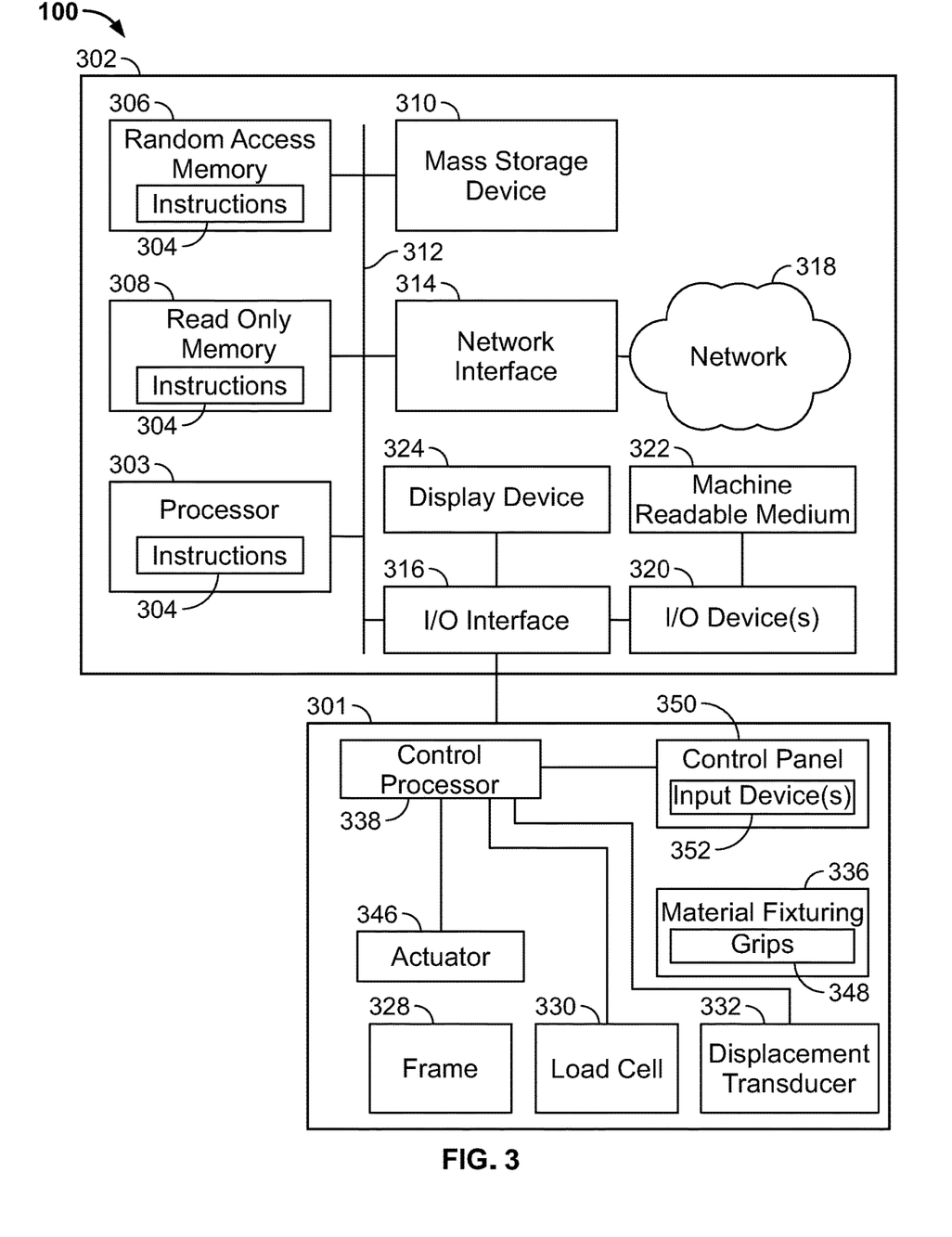
FIG. 3 is a block diagram of an example implementation of the hinged device test system of FIG. 1.

FIG. 3 is a block diagram of an example implementation of the hinged device test systems 100, 200 of FIGS. 1A, 1B, 2A, and/or 2B. As illustrated in FIG. 3, the hinged device test system 100 includes a test fixture 301 and a computing device 302.

The example computing device 302 may be a general-purpose computer, a laptop computer, a tablet computer, a mobile device, a server, an all-in-one computer, and/or any other type of computing device. The computing device 302 of FIG. 3 includes a processor 303, which may be a general-purpose central processing unit (CPU). In some examples, the processor 303 may include one or more specialized processing units, such as FPGA, RISC processors with an ARM core, graphic processing units, digital signal processors, and/or system-on-chips (SoC). The processor 303 executes machine-readable instructions 304 that may be stored locally at the processor (e.g., in an included cache or SoC), in a random access memory 306 (or other volatile memory), in a read-only memory 308 (or other non-volatile memory such as FLASH memory), and/or in a mass storage device 310. The example mass storage device 310 may be a hard drive, a solid-state storage drive, a hybrid drive, a RAID array, and/or any other mass data storage device. A bus 312 enables communications between the processor 303, the RAM 306, the ROM 308, the mass storage device 310, a network interface 314, and/or an input/output interface 316.

An example network interface 314 includes hardware, firmware, and/or software to connect the computing device 302 to a communications network 318 such as the Internet. For example, the network interface 314 may include IEEE 802.X-compliant wireless and/or wired communications hardware for transmitting and/or receiving communications.

An example I/O interface 316 of FIG. 3 includes hardware, firmware, and/or software to connect one or more input/output devices 320 to the processor 303 for providing input to the processor 303 and/or providing output from the processor 303. For example, the I/O interface 316 may include a graphics-processing unit for interfacing with a display device, a universal serial bus port for interfacing with one or more USB-compliant devices, a FireWire, a field bus, and/or any other type of interface. The example extensometer system 10 includes a display device 324 (e.g., an LCD screen) coupled to the I/O interface 316. Other example I/O device(s) 320 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 302 may access a non-transitory machine-readable medium 322 via the I/O interface 316 and/or the I/O device(s) 320. Examples of the machine-readable medium 322 of FIG. 8 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The test fixture 301 is coupled to the computing device 302. In the example of FIG. 3, the test fixture 301 is coupled to the computing device via the I/O interface 316, such as via a USB port, a Thunderbolt port, a FireWire (IEEE 1394) port, and/or any other type serial or parallel data port. In some examples, the test fixture 301 is coupled to the network interface 314 and/or to the I/O interface 316 via a wired or wireless connection (e.g., Ethernet, Wi-Fi, etc.), either directly or via the network 318.

The test fixture 301 includes a frame 328, a load cell 330, material fixtures 336, and a control processor 338. The frame 328 provides rigid structural support for the other components of the test fixture 301 that perform the test. The load cell 330 may implement the load cell 130 of FIGS. 1A, 1B, 2A, and/or 2B, and measures force applied to a material under test (e.g., the hinged device 102) by an actuator 346 via grips 348 (e.g., the plates 112, 114, 116).

The actuator 346 applies force to the material under test and/or forces displacement of the material under test, while the grips 348 grasp or otherwise couple the material under test to the actuator 346.

Example actuators that may be used to provide force and/or motion of a component of the test fixture 301 include electric motors, pneumatic actuators, hydraulic actuators, piezoelectric actuators, relays, and/or switches. While the example test fixture 301 uses a motor, such as a servo or direct-drive linear motor, other systems may use different types of actuators. For example, hydraulic actuators, pneumatic actuators, and/or any other type of actuator may be used based on the requirements of the system.

The example grips 336 include platens, clamps, and/or other types of fixtures, depending on the mechanical property being tested and/or the material under test. The grips 336 may be manually configured, controlled via manual input, and/or automatically controlled by the control processor 338.

The test system 100 may further include one or more control panels 350, including one or more input devices 352. The input devices 352 may include buttons, switches, and/or other input devices located on an operator control panel. For example, the input devices 352 may include buttons that control the actuator 342 to jog (e.g., position) the grips 348 to a desired position, switches (e.g., foot switches) that control the grips 348 to close or open (e.g., via another actuator), and/or any other input devices to control operation of the testing test fixture 301.

The example control processor 338 communicates with the computing device 302 to, for example, receive test parameters from the computing device 302 and/or report measurements and/or other results to the computing device 302. For example, the control processor 338 may include one or more communication or I/O interfaces to enable communication with the computing device 302. The control processor 338 may control the actuator 346 to move in a given direction and/or to control the speed of the actuator 346, control the fixture(s) 336 to grasp or release a material under test, and/or receive measurements from the displacement transducer 332, the load cell 330 and/or other transducers.

The example control processor 338 is configured to implement a repetitive motion testing process in which a test specimen (e.g., the hinged device 102) is subjected to testing in the test fixture 301. For example, to measure stress on the hinged device 102 during or after a series of folding and unfolding motions, the control processor 338 controls the actuator 346 to move the grips 348 (e.g., the first, second, and third plates 112, 114, 116) while monitoring the load cell 330 to measure stress on the hinged device 102. In some examples, the control processor 338 monitors a motor encoder of the actuator 346 to determine a folding angle and/or establish a folding degree-per-pulse ratio.

Figure 4:
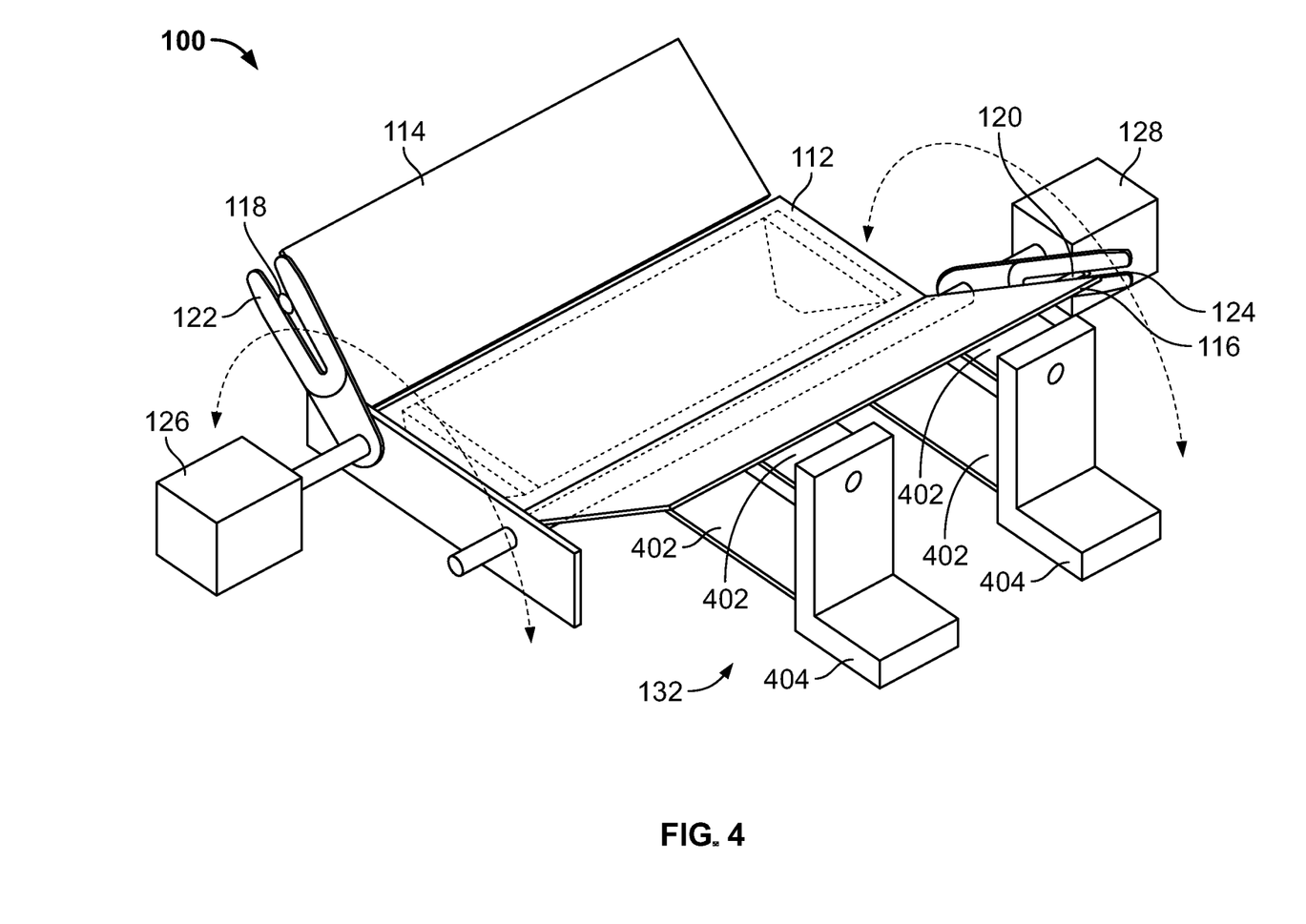
FIG. 4 is a perspective view of an example implementation of the hinged device test system of FIGS. 1A and 1B configured to perform load measurement testing on a multi-hinged device in which the hinges fold toward a same side of the device.

FIG. 4 is a perspective view of an example implementation of the hinged device test system 100 of FIGS. 1A and 1B configured to perform load measurement testing on a multi-hinged device in which the hinges fold toward a same side of the device. In the example of FIG. 4, the translation linkage 132 includes multiple flexures 402 attached to brackets 404, which support the flexures 402 at the desired height. The example system 100 is illustrated in FIG. 4 without the multi-hinge device 102.

Figure 5:
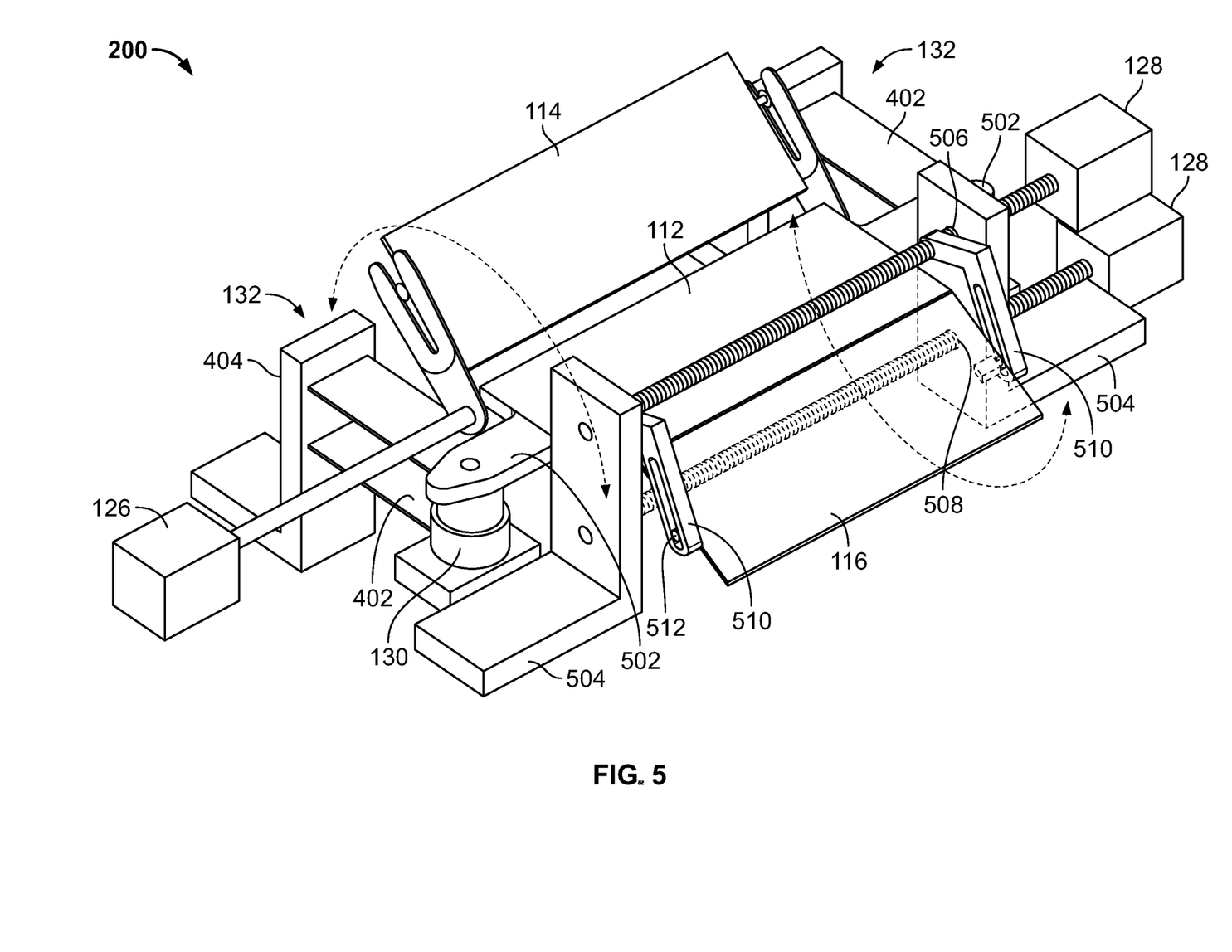
FIG. 5 is a perspective view of an example implementation of the hinged device test system of FIGS. 1A and 1B configured to perform load measurement testing on a multi-hinged device in which the hinges fold toward opposite sides of the device.

FIG. 5 is a perspective view of an example implementation of the hinged device test system 200 of FIGS. 2A and 2B configured to perform load measurement testing on a multi-hinged device 202 in which the hinges fold toward opposite sides of the device. As illustrated in FIG. 5, the translation linkage 132 (e.g., flexures 402 and brackets 404) and the load cell(s) 130 are positioned to the sides of the first plate 112, such that the translation linkage 132 and the load cell(s) 130 do not interfere with the path of motion of the second plate 116. The first plate 112 may include extensions 502 to couple the first plate to the flexures 402 and/or the load cell(s) 130.

The example of FIG. 5 may implement either of the example test systems 100, 200 of FIGS. 1A, 1B, 2A, and 2B by changing the position of the pivot point of the pivot the drive arm 124 via another bracket 504. By using the upper position 506, the drive arm 124 is configured to test inner-outer folding devices (e.g., the system 200). In contrast, by using the lower position 508, the drive arm 124 is configured to test double infold devices (e.g., the system 100). While multiple actuators 128 and corresponding shafts are illustrated as driving the third plate 116 in the example of FIG. 5, only one of the illustrated actuators 128 would be used in a given configuration.

As illustrated in FIG. 5, drive arms 510 may be coupled to the actuator 128 to rotate the third plate 116 via a cam follower 512 attached to the third plate 116. The drive arms 510 are offset (e.g., L-shaped) to align the axis of rotation of the third plate 116 with the device under test.

Figure 6A:
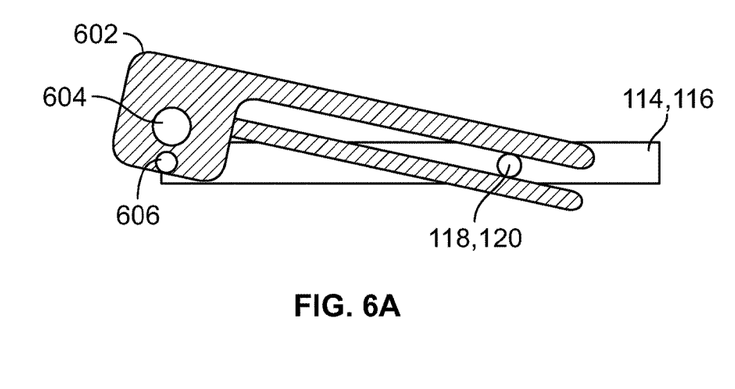
FIGS. 6A-6C illustrate side views of different orientations of an example drive arm that may be used to implement the drive arms of FIGS. 1A-2B, 4, and/or 5.
Figure 6B:
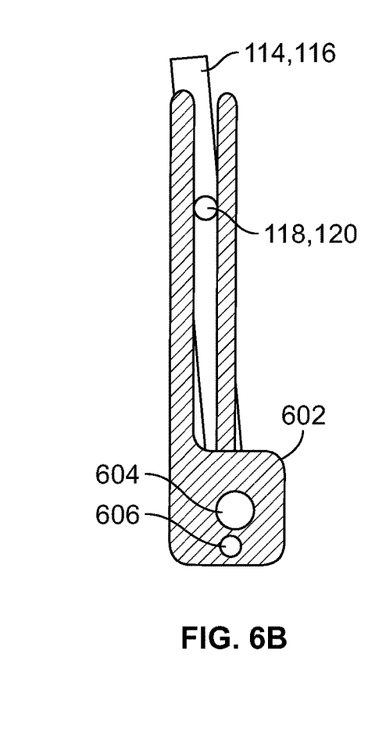
Figure 6C:
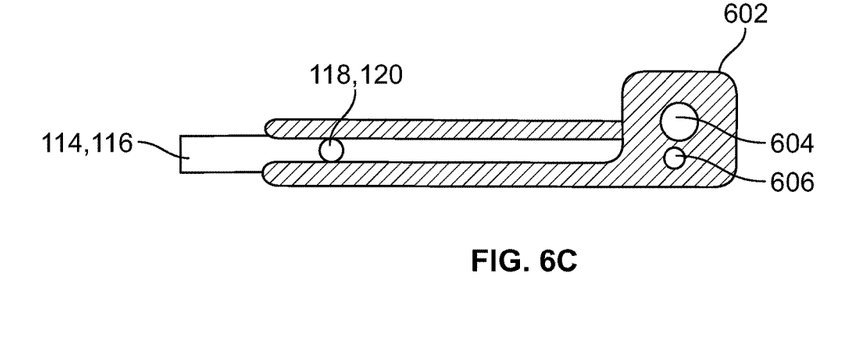

FIGS. 6A-6C illustrate side views of different orientations of an example drive arm 602 that may be used to implement the drive arms 122, 124 of FIGS. 1A-2B, 4, and/or 5, and corresponding orientations of the second or third plates 114, 116 attached to a cam follower 118, 120. The example drive arm 602 has a drive arm pivot axis 604, while the plate 114, 116 has a plate pivot axis 606 that is controlled by the hinge pivot axis of the multi-hinged device 102, 202.

Figure 7:
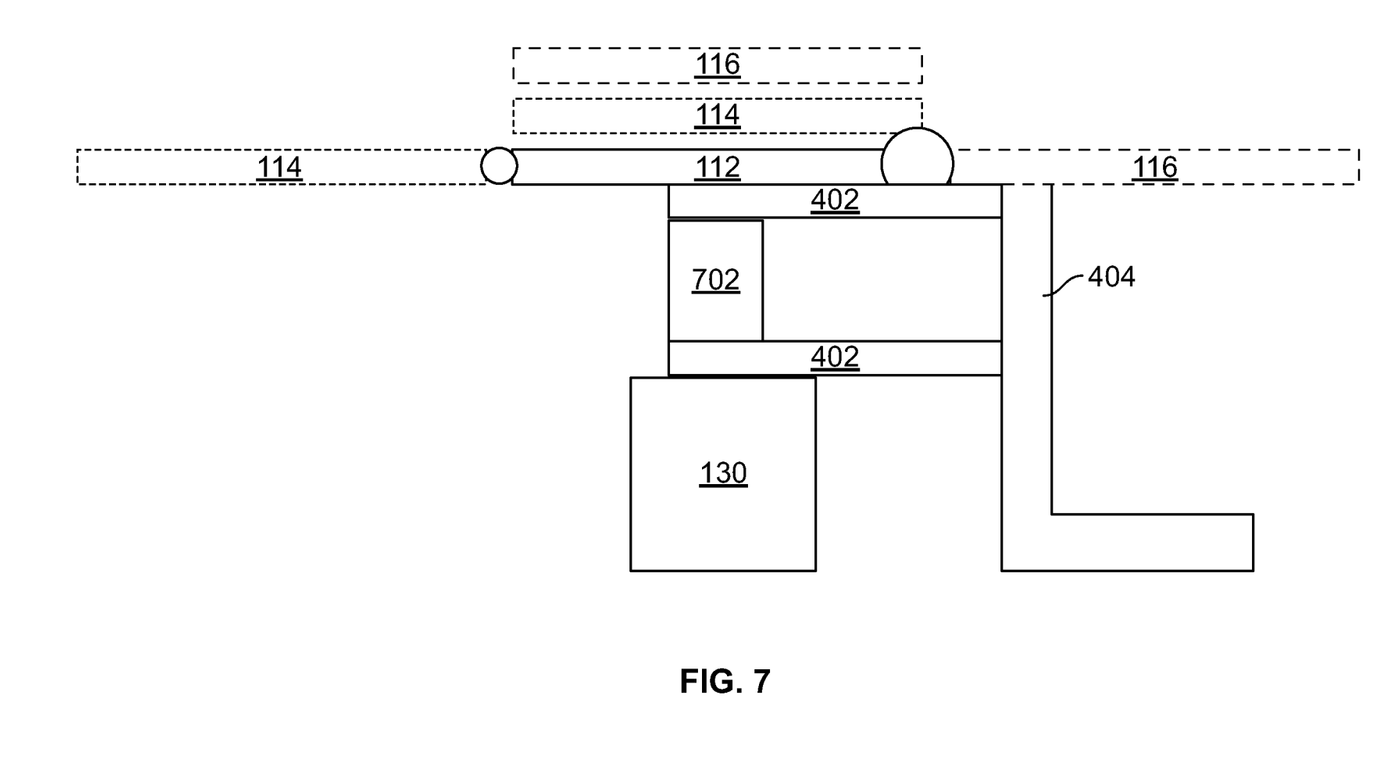
FIG. 7 is a block diagram illustrating an example arrangement of plates, support flexures, and load cells that may be used to implement the hinged device test system of FIGS. 1A-2B, 4, and/or 5.
Figure 8:
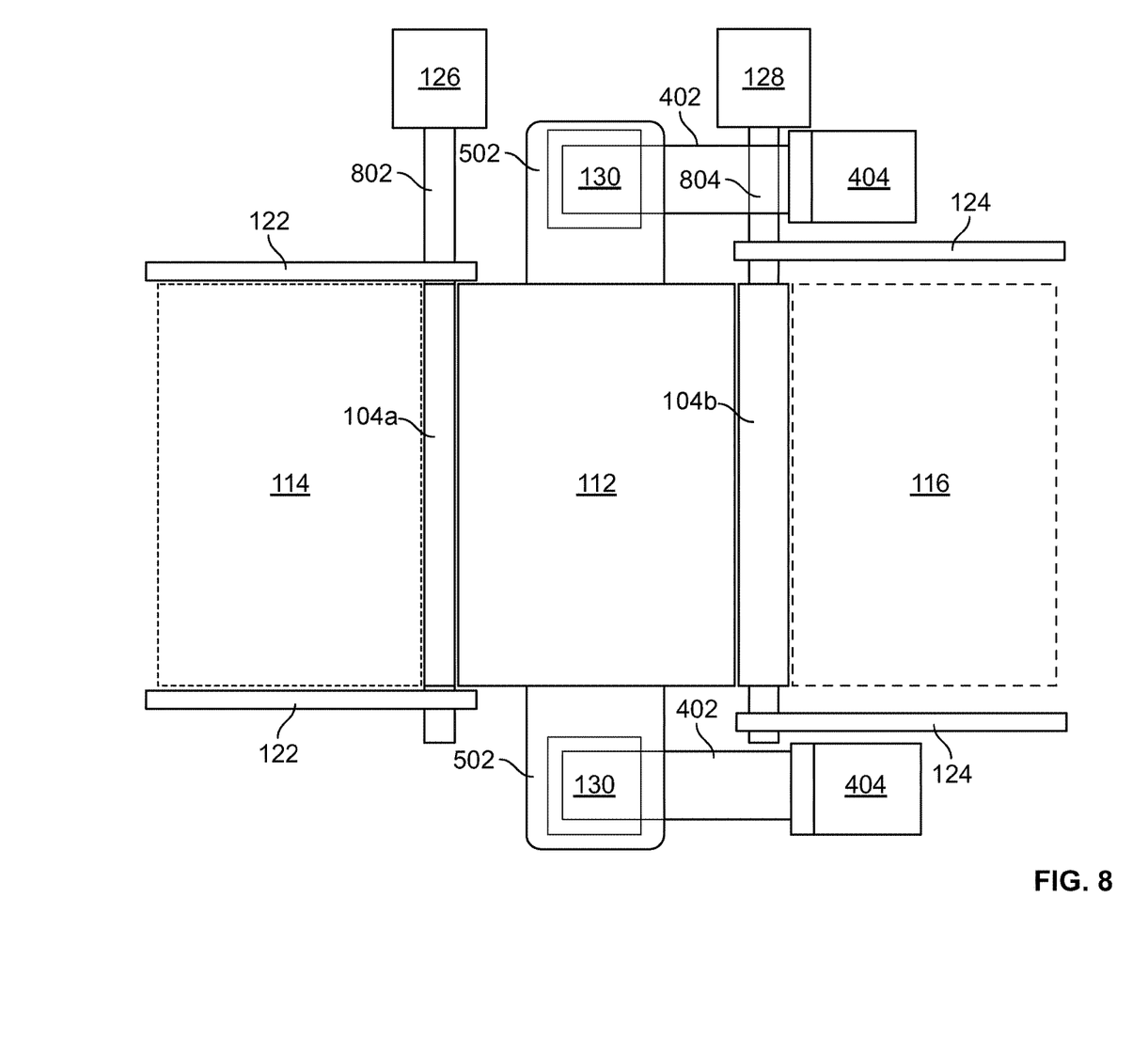
FIG. 8 is a top view of an example arrangement of the hinged device test system of FIGS. 1A-2B, 4, and/or 5.

FIG. 7 is a block diagram illustrating an example arrangement of plates, support flexures, and load cells that may be used to implement the hinged device test systems 100, 200 of FIGS. 1A-2B, 4, and/or 5. FIG. 8 is a top view of an example arrangement of the hinged device test system of FIGS. 1A-2B, 4, and/or 5.

As illustrated in FIG. 8, the center plate 112 may be supported on both sides by flexures 402 and flexure mounting brackets 404, which are coupled to the extensions 502 (e.g., tabs) of the center plate 112 so as to locate the flexures 402 out of the folding paths of the folding plates 114, 116. Similarly, the example of FIG. 8 includes load cells 130 on each side of the center plate 112 to accurately measure the forces on the center plate 112 during folding.

The example actuators 126, 128 may be coupled to pivot the drive arms 122, 124 on either side of the plates 114, 116 via respective shafts 802, 804.

Figure 9A:
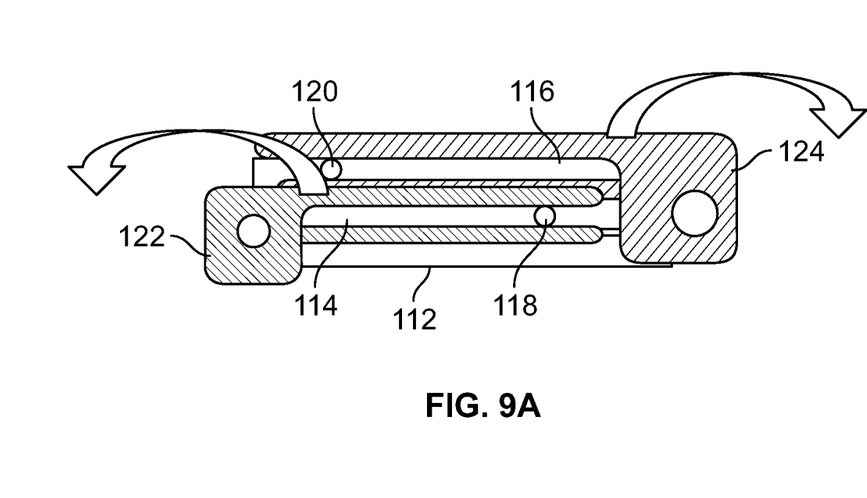
FIGS. 9A and 9B illustrate an example folding arrangement of drive arms for the hinged device test system of FIGS. 1A-2B, 4, and/or 5 for a multi-hinged device configured for a double infold.
Figure 9B:
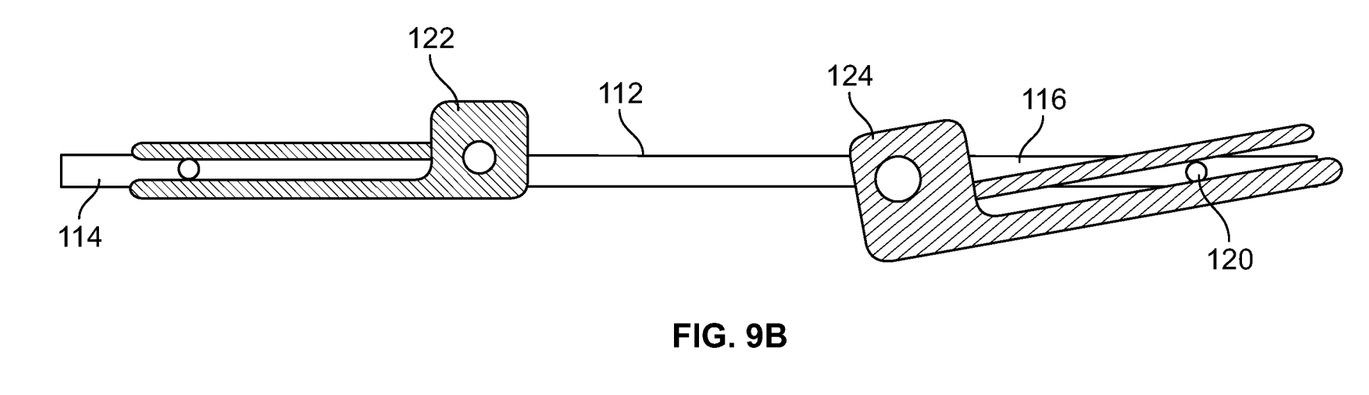

FIGS. 9A and 9B illustrate an example folding arrangement of drive arms 122, 124 for the hinged device test system 100 of FIGS. 1A-2B, 4, and/or 5 for a multi-hinged device configured for a double infold.

Figure 10A:
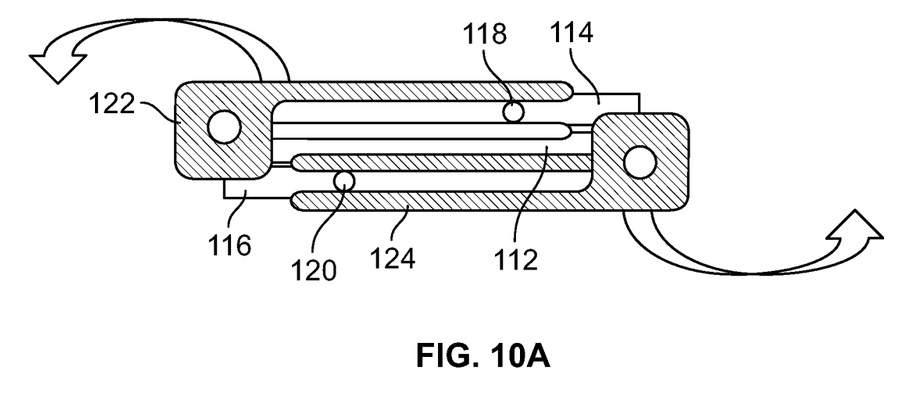
FIGS. 10A and 10B illustrate an example folding arrangement of drive arms for the hinged device test system of FIGS. 1A-2B, 4, and/or 5 for a multi-hinged device configured for an inner-outer fold.
Figure 10B:
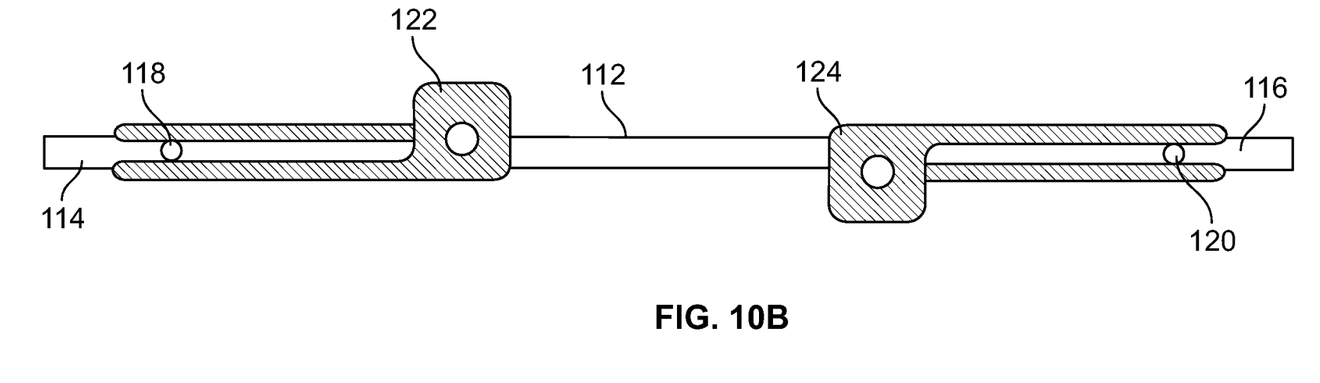

FIGS. 10A and 10B illustrate an example folding arrangement of drive arms 122, 124 for the hinged device test system 200 of FIGS. 1A-2B, 4, and/or 5 for a multi-hinged device configured for an inner-outer fold.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A hinged device testing system, comprising:
   a first plate comprising a first surface configured to hold stationary a first portion of a hinged device under test;
   a second plate comprising a second surface configured to hold a second portion of the hinged device under test, the second portion of the hinged device coupled to the first portion via a first hinge having a first folding radius;
   a third plate comprising a third surface configured to hold a third portion of the hinged device under test, the third portion of the hinged device coupled to the first portion via a second hinge having a second folding radius;
   a first cam follower coupled to the second plate;
   a first drive arm configured to move the first cam follower to cause the second plate to rotate about a first hinge pivot axis of the first hinge;
   a first actuator configured to rotate the first drive arm;
   a second cam follower coupled to the third plate;
   a second drive arm configured to move the second cam follower to cause the third plate to rotate about a second hinge pivot axis of the second hinge;
   a second actuator configured to rotate the second drive arm; and
   a load cell configured to measure first loads on the first plate while the first actuator moves the second plate and to measure second loads on the first plate while the second actuator moves the third plate.

2. The hinged device testing system as defined in claim 1, wherein the first cam follower, the first drive arm, and the first actuator are configured to fold the second portion of the hinged device toward a first side of the first portion of the hinged device, and the second cam follower, the second drive arm, and the second actuator are configured to fold the third portion of the hinged device toward the first side of the first portion of the hinged device, the second folding radius being larger than the first folding radius.

3. The hinged device testing system as defined in claim 2, further comprising a flexure configured to support the first plate, to limit a movement of the first plate in directions other than a direction in which the load cell is configured to measure loads, and to permit transfer of load from the hinged device under test to the load cell.

4. The hinged device testing system as defined in claim 1, wherein the load cell is one of a plurality of load cells coupled to the first plate to measure the first loads and the second loads.

5. The hinged device testing system as defined in claim 1, wherein the first actuator is configured to rotate the first drive arm during a first time period while the load cell measures the first loads, and the second actuator is configured to rotate the second drive arm during a second time period while the load cell measures the second loads, wherein the first time period does not overlap with the second time period.

6. The hinged device testing system as defined in claim 1, wherein the first drive arm comprises a first slot extending radially from a first arm pivot axis of the first drive arm, and the first slot is configured to guide the first cam follower as the first drive arm is rotated.

7. The hinged device testing system as defined in claim 1, wherein the second drive arm comprises a second slot, wherein a second arm pivot axis of the second drive arm is offset from a line extending through the second slot.

8. The hinged device testing system as defined in claim 7, wherein the second slot is configured to permit the second cam follower to move freely along the second slot as the second drive arm is rotated.

9. The hinged device testing system as defined in claim 1, wherein the first cam follower, the first drive arm, and the first actuator are configured to fold the second portion of the hinged device toward a first side of the first portion of the hinged device, and the second cam follower, the second drive arm, and the second actuator are configured to fold the third portion of the hinged device toward a second side of the first portion of the hinged device.

10. The hinged device testing system as defined in claim 9, further comprising a flexure configured to support the first plate, to limit a movement of the first plate in directions other than a direction in which the load cell is configured to measure loads, and to permit transfer of load from the hinged device under test to the load cell, wherein the flexure is positioned laterally to the first plate with respect to corresponding paths of movement of the first and second drive arms.

11. The hinged device testing system as defined in claim 1, further comprising:
   a shaft configured to couple the second actuator to the second drive arm; and
   a bracket configured to hold the shaft in a first position to fold the third portion of the hinged device toward a second side of the first portion of the hinged device, and to hold the shaft in a second position to fold the third portion of the hinged device toward a first side of the first portion of the hinged device, wherein the first cam follower, the first drive arm, and the first actuator are configured to fold the second portion of the hinged device toward the first side of the first portion of the hinged device.

12. The hinged device testing system as defined in claim 11, wherein the first position of the shaft in the bracket is on the first side of the first portion, and the second position of the shaft in the bracket is on the second side of the first portion.

13. The hinged device testing system as defined in claim 1, further comprising a first hinge support plate configured to hold a first side of the first hinge separately from the first plate.

14. The hinged device testing system as defined in claim 13, wherein the second plate is configured to hold the second side of the first hinge, such that the first hinge controls a folding path of the second portion of the hinged device under test as the first actuator moves the second plate.

15. The hinged device testing system as defined in claim 13, wherein the hinge support plate, the second plate, the first plate, the first drive arm, and the first cam follower are configured to limit forces on the load cell to forces of the hinged device under test during folding and unfolding without forces created by the first hinge during the folding and unfolding.

16. The hinged device testing system as defined in claim 1, wherein the first actuator is configured to rotate the first drive arm and the second actuator is configured to rotate the second drive arm simultaneously while the load cell measures the loads.

* * * * *